US010944818B1

(12) United States Patent
Izenberg et al.

(10) Patent No.: US 10,944,818 B1
(45) Date of Patent: Mar. 9, 2021

(54) TIME SYNCHRONIZATION MONITORING WITH CLIENT MIRRORING

(71) Applicant: Amazon Technologies, Inc., Seattle, WA (US)

(72) Inventors: Erez Izenberg, Tel Aviv (IL); Nafea Bshara, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 293 days.

(21) Appl. No.: 15/691,516

(22) Filed: Aug. 30, 2017

(51) Int. Cl.
*H04L 29/08* (2006.01)
*H04L 29/06* (2006.01)
*H04J 3/06* (2006.01)
*H04L 12/26* (2006.01)

(52) U.S. Cl.
CPC ........ *H04L 67/1095* (2013.01); *H04J 3/0661* (2013.01); *H04L 43/0852* (2013.01); *H04L 43/0888* (2013.01); *H04L 43/106* (2013.01); *H04L 67/42* (2013.01)

(58) Field of Classification Search
CPC ............. H04L 67/1095; H04L 43/0852; H04L 43/0888; H04L 43/106; H04L 67/42; H04J 3/0661
See application file for complete search history.

(56) References Cited

U.S. PATENT DOCUMENTS 5,968,133 A * 10/1999 Latham ............... G06F 1/14 709/220
7,865,331 B2 * 1/2011 Dzung ................ H04J 3/0682 455/231
9,565,646 B1 * 2/2017 Pearson ............ H04W 56/0035
2014/0226553 A1 * 8/2014 Ko ...................... H04J 3/0635 370/312
2016/0073365 A1 * 3/2016 Klockar ............. H04W 56/001 370/503

OTHER PUBLICATIONS

Precision Time Protocol (PTP/IEEE-1588). [online]. End Run Technologies [retrieved on Jul. 13, 2017]. Retrieved from the Internet: <URL: https://www.endruntechnologies.com/pdf/PTP-1588.pdf >, 6 pages.

* cited by examiner

*Primary Examiner* — June Y Sison
(74) *Attorney, Agent, or Firm* — Kilpatrick Townsend & Stockton LLP

(57) ABSTRACT

In various implementations, provided are techniques for verifying the accuracy of the network time maintained by a client device. In various implementations, a server can be configured to obtain network time information from a network. A particular client device can also obtain the network time information, and use the network time information to compute a network time for applications executing on the network device. The client device can periodically transmit the network time information to the mirror server. When the mirror server receives the time synchronization information from a client device, the mirror server can compare the client device's network time information to the network time information captured by the mirror server. In this way, the mirror server can verify the client device's time accuracy. The mirror server and/or the client device can subsequently perform a corrective action when the client device's time is not accurate.

21 Claims, 9 Drawing Sheets

US 10,944,818 B1

TIME SYNCHRONIZATION MONITORING WITH CLIENT MIRRORING

BACKGROUND

Network devices in a network use time for various purposes. Network devices, including host devices and network infrastructure devices, can use the current time for purposes internal to an individual device, such as for example to apply a timestamp to a file when the file is created or modified, to apply timestamps to searches and other activity in a database, to apply timestamps to activities recorded in log files, and/or to track a current up time (how long the device has been powered on), among other things.

Network devices can also use the current time for external purposes, including inserting timestamps into network packets and attaching timestamps to events that are communicated to the network. A network device can, for example, attach a timestamp to a packet when transmitting the packet. As another example, a network device can extract a timestamp from a packet received from the network, and compare the extracted timestamp against a time being maintained by the network device.

Timestamps can further be used to analyze the performance of a network. For example, timestamps can be used to measure the latency across the network. Latency across the network can be measured, for example, as an average amount of time a packet needed to traverse the network from a source device to a destination device. Timestamps can also, for example, be used to measure packet throughput, that is, the number of packets that can cross the network at a given moment.

Network devices can maintain time individually. A network device can have an internal clock circuit that is driven, for example, by a crystal oscillator. The clock circuit can increment every second, every millisecond, or at some fraction of a second. At any given moment, the clock circuit can provide the current time as a numerical value. The numerical value can then be inserted into file system records, database records, log files, and/or packets.

BRIEF DESCRIPTION OF THE DRAWINGS

Various embodiments in accordance with the present disclosure will be described with reference to the drawings, in which.

DETAILED DESCRIPTION

Figure 1:
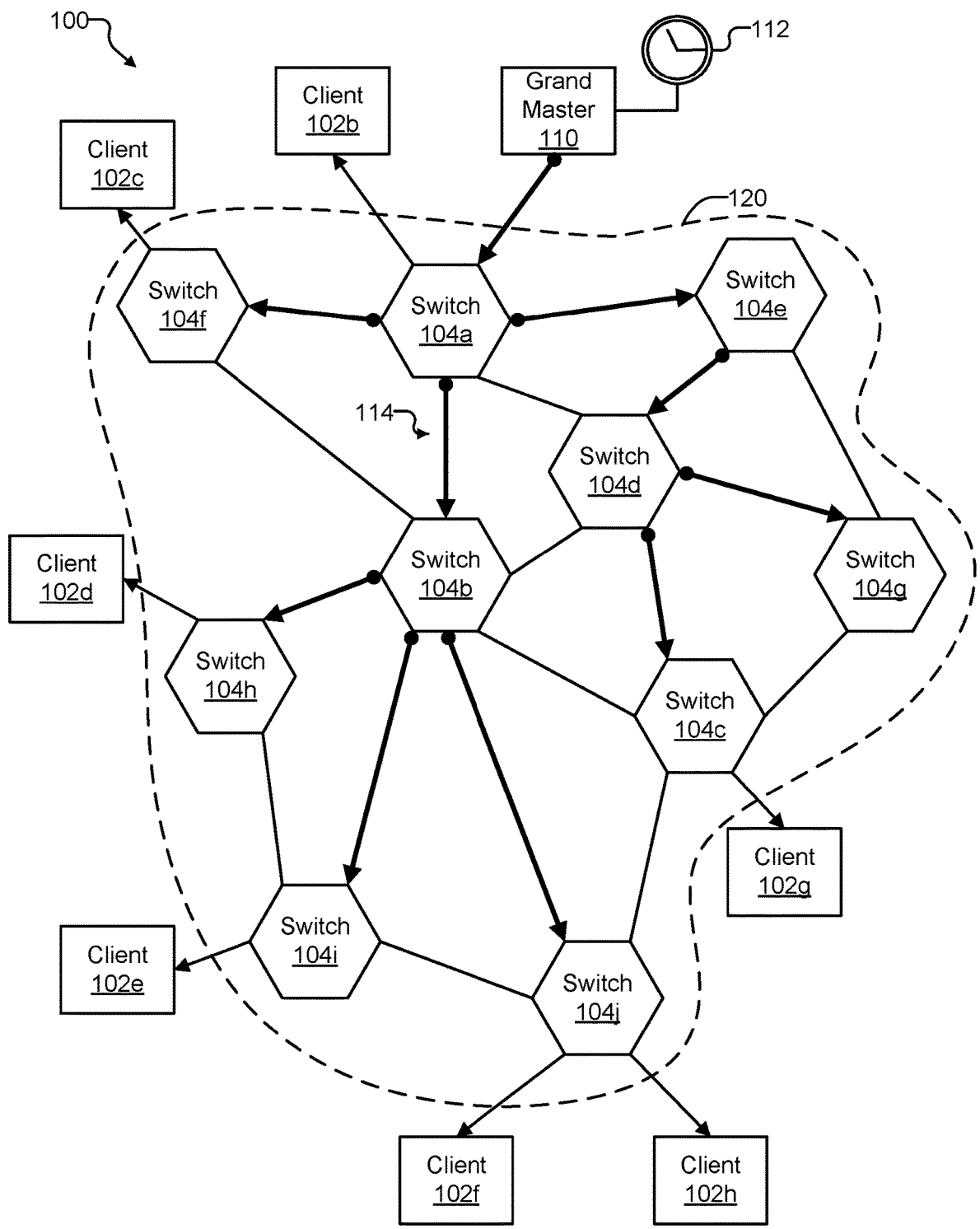
FIG. 1 illustrates an example of a computer network that includes a grand master to provide a network time to the network.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Network devices in a network use time for various purposes. Time, in this context, can mean one or more of a year, month, day, hour, minute, second, and/or fraction of a second, where fractions of a second can be provided in milliseconds, nanoseconds, femtoseconds, etc. Time can also include a clock frequency. Network devices, including host devices and network infrastructure devices, can use the current time for purposes internal to an individual device, such as for example to apply timestamp to a file when the file is created or modified, to apply timestamps to searches and other activity in a database, to apply timestamps to activities recorded in log files, and/or to track a current up time (how long the device has been powered on), among other things. The time can also be provided to software applications executing on the network device, such as for example when the software applications require time as part of normal operations.

Network devices can also use the current time for external purposes, including inserting timestamps into network packets and attaching timestamps to events that are communicated to the network. A network device can, for example, attach a timestamp to a packet when transmitting the packet. In this example the timestamp can indicate the time at which the network device transmitted the packet. As another example, a network device can extract a timestamp from a packet received from the network, and compare the extracted timestamp against a time being maintained by the network device. The timestamp, in this example, can be used to determine an amount of time it took for the packet to reach the network device.

Timestamps can further be used to analyze the performance of a network. For example, timestamps can be used to measure the latency across the network. Latency across the network can be measured, for example, as an average amount of time a packet needed to traverse the network from a source device to a destination device. Timestamps can also, for example, be used to measure packet throughput, that is, the number of packets that can cross the network at a given moment. Timestamps can thus be useful for monitoring and improving the performance of a network.

Network devices can maintain time individually. A network device can have an internal clock circuit that is driven, for example, by a crystal oscillator. The clock circuit can increment every second, every millisecond, or at some fraction of a second. At any given moment, the clock circuit can provide the current time as a numerical value. In network devices, the numerical value is typically an offset from what is known as the epoch time, which sets time zero at 12:00 am, Jan. 1, 1970.

For timestamps to be meaningful and useful, the time being used by each device in a network should be approximately the same. Approximately the same means that the time maintained by each network device is similar to within an acceptable degree of difference. Differences in time that are outside of the acceptable degree of difference may cause values such as latency and throughput measurements to be inaccurate.

Various time synchronization protocols can be used to synchronize the devices in a network to a common network time. In small networks, where most of the network devices may be directly connected to one another, these time synchronization protocols can synchronize the network devices relatively accurately, such as to within about 100 nanoseconds (ns). In very large networks, however, time synchronization protocols may suffer some deficiencies. For example, a time protocol may call for a device in the network to be designated as a master time keeper, also referred to herein as a time provider or grand master. The master time keeper can be configured to maintain highly accurate time, for example by being connected to an atomic clock or a Global Positioning System (GPS) receiver. In very large networks, however, network latencies and packets dropped in the can affect the accuracy of the time when a client device is far, in terms of network hops, from the master time keeper. A device in the network, however, may lose the ability to communicate with the master time keeper, and when this occurs, the device, or possibly an entire segment of the network, may no longer be synchronized to the same time.

A possible solution for the problem of losing touch with the master time keeper is for the network to include at least one back-up master time keeper. When the primary master time keeper becomes disabled or unreachable, the backup master time keeper can be activated to provide a network time to the part of the network that cannot reach the primary master time keeper. But a period of time may be required for devices in the network to synchronize to the time provided by the backup master time keeper. Additionally, any part of the network that is still able to communicate with the primary master time keeper may be synchronized to a different time.

Another problem with relying on one master time keeper is that, in networks that includes hundreds of thousands of nodes, network latencies from one end of the network to another may be significant. Thus, a network device that is very far, in terms of network links, from the master time keeper may synchronize to a network time that is delayed from the network time at the master time keeper. In a very large network, network devices that are very far from the master time keeper may have a different time from network devices that are close to the master time keeper.

Highly accurate time may be of particular importance in high-performance, high reliability networks. To maintain high performance, network analytics may be constantly monitoring latency and throughput, and the network may be continuously adjusted to relieve congestion, bypass link failures, and/or to manage bursts of dense network traffic. To maintain high reliability, the network may be configured with redundant links, so that, in the best case, all host devices on the network can be reached even when links or nodes in the network fail. In order for timestamps to remain accurate in a high reliability network, time synchronization across the network should also be reliable.

In various implementations, provided are techniques for verifying the accuracy of the network time maintained by a client device. In various implementations, a network device, such as a server or mirror server, can be configured to obtain network time information from a network. The server can be located close to a master time keeper, such as within one or two network hops or on the same switch as the master time keeper, or can obtain the network time directly from the master time keeper (e.g., using a dedicated communication channel). By being close to the master time keeper, the mirror server is more likely to have an accurate network time than a client device that is many hops away.

A particular client device can also obtain the network time information, and use the network time information to compute a network time for applications executing on the network device. The client device can periodically transmit the network time information to the mirror server.

The mirror server can be associated with a number of client devices across the network. Periodically, these client devices can generate a packet that includes the time synchronization information the client devices obtained from the network. The client devices can then transmit these packets to the mirror server. When the mirror server receives the time synchronization information from a client device, the mirror server can compare the client device's network time information to the network time information captured by the mirror server. In this way, the mirror server can verify the client device's time accuracy.

In various implementations, the mirror server can take a number of different actions when a client device's time deviates more than a threshold value from the time that the mirror server determines is the official network time. For example, the mirror server can notify the client device of the deviation, so that the client device can make a correction. As another example, the mirror server can request that the frequency of time synchronization cycles be increased. As another example, the mirror server can request that the problematic client device obtain the network time from another source. As another example, the mirror server can alert a network administrator. In these and other examples, the inaccuracy at the client device can be corrected.

FIG. 1 illustrates an example of a computer network 100 that includes a grand master 110 to provide a network time to the network 100. The example network 100 includes a switch fabric 120, through which multiple network devices configured as client devices 102a-102f can communicate with one another. The client devices 102a-102f can be, for example, server computers, data storage arrays, personal computing devices, and/or printers or other peripheral devices, among other things. The client devices 102a-102f can use one or more network protocols to transmit packets across the switch fabric 120. Though only a small number of client devices 102a-102f are illustrated in this example network 100, other example networks can include thousands or hundreds of thousands of client devices.

A switch fabric, which may also be referred to as a switching fabric, can include multiple interconnected network infrastructure devices. In the illustrated example, the switch fabric 120 is illustrated with multiple switches 104a-104j. In other examples, the switch fabric 120 can include a combination network infrastructure devices, including switches, routers, hubs, and/or repeaters, as well as gateway devices that can connect the network 100 to other networks. Though only a few switches 104a-104j are illustrated, a switch fabric can include thousands or hundreds of thousands of switches and/or other network infrastructure devices.

In various implementations, the client devices 102a-102f can be connected to switches 104a-104j at the boundary or edges of the switch fabric 120. The switches 104a-104j may each have multiple connections to other switches 104a-104j within the switch fabric 120, such that there can be multiple paths from one client device 102a-102f to another client device 102a-102f across the switch fabric 120. In various implementations, packets from one client device 102a-102g to another client device 102a-102g can be sent using different paths in the switch fabric 120. Doing so can be beneficial for achieving high throughput and low latency, in that the packets can travel over the shortest path and/or the least congested path. The multiple paths can also be beneficial for reliability, in that, should a link between any two switches 104a-104j fail, packets can use a different link to reach the same destination.

As discussed above, each client device 102a-102f and each switch 104a-104j in the example network 100 may individually be maintaining the current time, including a date, hour, minute, second, and/or fraction of a second. The time being maintained internally by an individual device will be referred to herein as the device time or device local time. Each client device 102a-102f and switch 104a-104j may be using a device local time for internal purposes, such as for counters, alarms, and/or displaying a clock. Each client device 102a-102f and switch 104a-104j may also be using a device local time for external purposes, such as attaching timestamps to transmitted packets or comparing timestamps in received packets to the current time. The individual devices can also be using a device local time to assign timestamps to events occurring in the network 100, such as link failures, new links being established, snapshots of network statistics, and so on.

For timestamps being passed around the network 100 to be meaningful, the device time of each client device 102a-102f and switch 104a-104j should be synchronized to a common time, which will be referred to herein as the network time. Assume, for example, that the device time at a first client device 102b is a few seconds ahead of the device time at a second client device 102e. In this example, when the second client device 102e receives a packet from the first client device 102b, a timestamp in the packet will include those few seconds, and thus it may seem, at the second client device 102e, that the packet arrived faster than it really did. To provide a more concrete example, the packet can be transmitted by the first client device 102b when the time at the first client device 102b is 10:00:05 and the time at the second client device 102e is 10:00:00. The packet may arrive at the second client device 102e when the time at the second client device 102e is 10:00:10 and the time at the first client device 102b is 10:00:15. In this example, according to the time at the first client device 102b, the packet took ten seconds to reach the second client device 102e, but according to the time at the second client device 102e, the packet took five seconds to arrive.

Confusion over the time can be compounded as a packet traverses the switch fabric 120. For example, each switch 104a-104j may attach a timestamp to a packet, which can be used to trace a packet's route through the switch fabric 120. A packet transmitted by a first client device 102b may pass through switch 104a, switch 104b, and switch 104i to reach a second client device 102e. Another packet from the first client device 102b can pass through switch 104a, switch 104d, switch 104c, switch 104j, and switch 104i to reach the second client device 102e, which, though a longer route, may be a faster route because of congestion along the other route. Without synchronized time across the switch fabric 120, understanding the different latency across these paths may be difficult.

To provide a common, official network time, in various implementations, the example network 100 can be configured with a time synchronization tree 114. In various implementations, the network 100 can use the time synchronization tree 114 to synchronize each device in the network to a common, network time. The time synchronization tree 114 uses the existing network links used by the switches 104a-104j to transfer network traffic, and do not require special or dedicated network links. Thus, in the illustrated example, the paths in the time synchronization tree 114 have been illustrated as overlaying the network links in the switch fabric 120.

Using a tree structure to distribute the network time to the network 100 ensures that, for any given device in the network, only one neighboring device (the parent vertex in the tree) will be providing the time to the given device (a child vertex in the tree). Neighboring, in this context, describes devices that share a network link (e.g., switch 104a and switch 104d share a network link). Having more than one device provide the network time to any given node may create an ambiguity as to which provider's time is the correct time, thus each node may have only time provider. A given device itself can be the time provider for multiple other devices, so that the time can be distributed across the network 100 quickly.

In time synchronization tree 114, the a network device has been designated as a master time provider, or grand master 110. The grand master 110 functions as the root of the time synchronization tree 114, and provides the network time to the network 100. Any device that is able to maintain a time, including network infrastructure devices, can be a grand master. For example, one of the switches 104a-104j can be designated as the root of the time synchronization tree 114. In this example, in some implementations, the master time keeper switch may provide the time from a local processor.

In some implementations, the grand master 110 can use its own device local time as the network time. Alternatively or additionally, in some implementations, the grand master 110 can include or be connected to a clock source 112. The clock source 112 can be, for example, an atomic clock or a satellite navigation system receiver, such as a Global Positioning System (GPS) receiver, which can obtain the time from a satellite system. The clock source 112 can otherwise be some other device capable of keeping or obtaining highly accurate time. The clock source 112 may provide the time with a higher degree of precision than the grand master's internal clock may be capable of.

Alternatively or additionally, in some implementations, the grand master 110 may receive the network time from a control plane, which can be local or can be remote to the grand master 110 itself. The control plane is the part of a network that carries signaling traffic and is responsible for routing. Functions of the control plane include system configuration and management. The control plane, the data plane, and the management plane are the three basic components of a telecommunication architecture. The control plane and management plane serve the data plane, which bears the traffic that the network exists to carry. The management plane, which carries administrative traffic, is considered a subset of the control plane.

In the time synchronization tree 114, each of the switches 104a-104j function as vertices in the tree structure, for purposes of distributing the network time. The branches of the tree structure provide paths, over existing network links, from the grand master 110 to each switch 104a-104j in the switch fabric 120. Each path has been determined such that there is a single path from the grand master 110 to each switch 104a-104j, in accordance with the tree structure. For example, the grand master 110 is connected to the switch 104a. From the switch 104a, the time synchronization tree 114 includes individual paths to switch 104f, switch 104b, and switch 104e. From switch 104b, there are paths to switch 104*h*, 104*i*, and 104*j*. Returning to switch 104*e*, from switch 104*e* there is a path to switch 104*d*. From switch 104*d*, there are paths to switch 104*c* and 104*g*.

Each of the switches 104*a*-104*j* in the switch fabric 120 can use the paths provided by the time synchronization tree 114 to synchronize to the network time. Using, for example, time synchronization protocols (discussed further below), the grand master 110 can synchronize the time the nearest switch, switch 104*a*. The switch 104*a* can further synchronize with neighboring switches 104*b*, 104*d*, 104*f*, as designated by the time synchronization tree 114. These switches 104*b*, 104*d*, 104*f* can then synchronize with their neighboring switches 104*d*, 104*h*, 104*f*, 104*j*, and so on until the end of each path in the time synchronization tree 114 is reached. The client devices 102*b*-102*f* in the network 100 can further synchronize with the nearest switch 104*a*, 104*f*, 104*h*, 104*i*, 104*j* to which each client device 102*b*-102*f* is connected. In this way, each client device 102*a*-102*f* and each switch 104*a*-104*j* can obtain one common network time.

The network 100 can be configured to use various techniques to synchronize the network time across the network 100. These techniques can involve an exchange of network packets between a network device acting as a time provider, also referred to as a time source or master, and a network device acting as time recipient, also referred to as a time destination or slave. Using the network packets, the time provider and the time recipient can determine a difference between the time being kept by each device. The time recipient can then use the difference to adjust its time to be approximately the same as the time of the time provider. The time at the time recipient can match the time of the time provider within a certain degree of accuracy, such as within a millisecond or within a nanosecond, or within some other fraction of a second. Various time synchronization protocols can provide varying degrees of accuracy. For example, in a local area network, the Network Time Precision (NTP) protocol can match the time between the time provider and the time recipient to within one millisecond (ms) or less. As another example, Precision Time Protocol (PTP) can achieve accuracy to within a less than a microsecond (p). Time synchronization protocols are discussed further below with respect to FIG. 3.

In the example of FIG. 1, each switch 104*a*-104*j* and/or each port of a switch can be a time provider, and each switch 104*a*-104*j* and/or each port of a switch can be a time receiver. Ports from which time is being provided are illustrated using dots, and ports at which time is being received are illustrated using arrowheads. For example, the switch 104*a* is the time provider for three switches 104*f*, 104*b*, 104*d*. Similarly, switch 104*b* provides the time to switch 104*f*, switch 104*f*, and so on.

Time synchronization typically occurs periodically. The network 100 may synchronize the entire network 100 more frequently when the network is initially brought up, so that each device in the network 100 can converge to the common, network time. Once the network time has been established at each device, the network 100 can synchronize less frequently, to maintain the network time across the network 100. Small differences in the internal clocks of each device may cause the device local times of each device to gradually differ, or drift, from one another. The network 100 can thus be configured to synchronize all the devices to the network time at regular intervals. In some implementations, synchronization can also be triggered when a new device is added to the network. In these implementations, the entire network 100 may be resynchronized, or only devices in the neighborhood of the new device may be synchronized. Synchronization of the whole network 100 or in the area of the new device may be more frequent for a short period, until the new device, and any devices receiving the network time from the new device have received the network time.

The time synchronization tree 114 may be adequate for distributing the network time across the network 100, particularly when the network 100 is relatively small. Network link failures, or a switch going offline, can be problematic for time synchronization, but the impact in a small network may be acceptable. For example, when a network link fails in a small network, it may be that only a few devices in the network can no longer synchronize to the network time.

Additionally, a small network may be able to tolerate a little less time accuracy while the link failure is fixed, since there may be few devices, few network links, and/or less concern over the latency and throughput of the network.

When the network 100 is very large, however, a single link failure may cause a large part of the network 100 to be disconnected from the network time. Ordinary network traffic may suffer little disruption, since the network traffic can take a route through the network that bypasses the failed link. But, in a tree structure, because each network device has only one path to the grand master 110, once a network link is fails, all paths connected through that link are affected.

Figure 2:
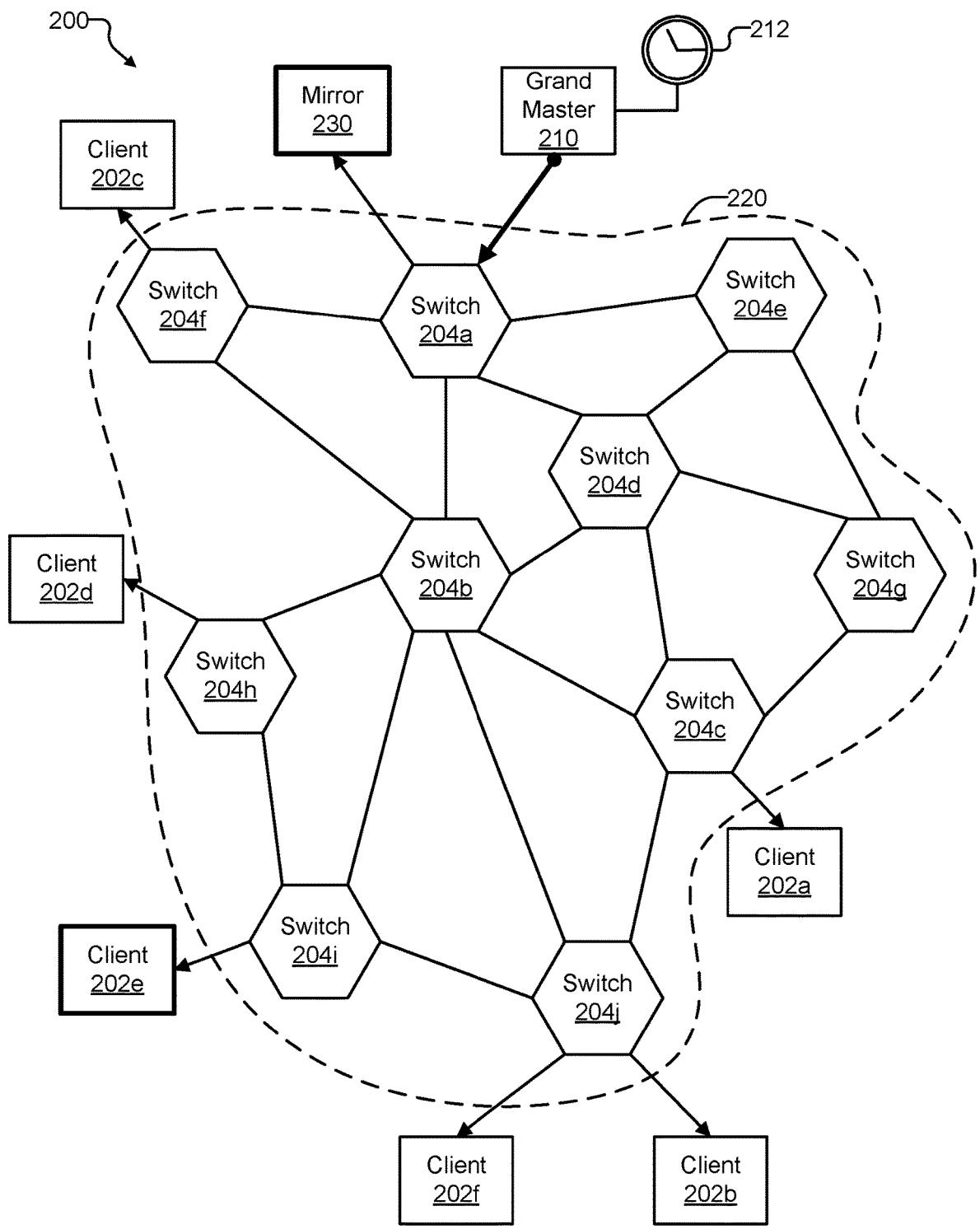
FIG. 2 illustrates an example of a network that includes a network device configured as a mirror server.

FIG. 2 illustrates an example of a network 200 that includes a network device configured as a mirror server, which may be referred to herein as a mirror device or a mirror 230. The mirror 230 can be configured to check the time accuracy of multiple client devices, such as, in the illustrated example, the client device 202*e*. The example network 200 includes a switch fabric 220, through which multiple network devices configured as client devices 202*a*-202*f* can communicate with one another. The client devices 202*a*-202*f* can be, for example, server computers, data storage arrays, personal computing devices, and/or printers or other peripheral devices, among other things. The client devices 202*a*-202*f* can use one or more network protocols to transmit packets across the switch fabric 220. Though only a small number of client devices 202*a*-202*f* are illustrated in this example network 200, other example networks can include thousands or hundreds of thousands of client devices.

In the illustrated example, the switch fabric 220 is illustrated with multiple switches 204*a*-204*j*. In other examples, the switch fabric 220 can include a combination network infrastructure devices, including switches, routers, hubs, and/or repeaters, as well as gateway devices that can connect the network 200 to other networks. Though only a few switches 204*a*-204*j* are illustrated, a switch fabric can include thousands or hundreds of thousands of switches and/or other network infrastructure devices.

In various implementations, the client devices 202*a*-202*e* can be connected to switches 204*a*-204*j* at the boundary or edges of the switch fabric 220. The switches 204*a*-204*j* may each have multiple connections to other switches 204*a*-204*j* within the switch fabric 220, such that there can be multiple paths from one client device 202*a*-202*e* to another client device 202*a*-202*e* across the switch fabric 220. In various implementations, packets from one client device 202*a*-202*e* to another client device 202*a*-202*g* can be sent using different paths in the switch fabric 220.

The example network 200 also includes a network device that has been designated as a master time provider or grand master 210. The grand master 210 can include or be connected to a highly accurate clock source 212. The grand master 210 can further be configured to provide an official network time to the network. Though not illustrated here, a time synchronization tree can be configured using the links in the switch fabric 220. The time synchronization tree can provide a distribution path from the grand master 210 to each of the client device 202a-202f in the network 200, over which each client device 202a-202f can obtain the official network time.

The example network 200 has also includes a network device configured as a mirror 230. In some implementations, the mirror 230 is another client device that verifies time accuracy as one function among many other functions. In some implementations, the mirror 230 only verifies time accuracy, and has no other function. Though only one mirror 230 is illustrated here, in other examples, the network 200 can include more than one mirror.

The mirror 230 is selected to be in close proximity to the grand master 210. For example, in the illustrated example, the mirror 230 is connected to the same switch 204a as is the grand master 210. In this example, the mirror 230 is only two hops away from the grand master 210. Placing the mirror 230 close to the grand master 210 can reduce the likelihood that network latencies, packet drops, and other issues will affect the network time that the mirror 230 obtains from the network. In various implementations, the mirror 230 can obtain the time from the network using the same techniques that can be used by the client devices 202a-202f For example, the mirror 230 can conduct an exchange of packets with the switch 204a, where the format of the packets is determined by a time keeping protocol such as PTP or NTP.

In some implementations, the mirror 230 can include a clock source, such as an atomic clock and/or a satellite navigation system receiver. In these implementations, the mirror 230 can use its own clock source when verifying the time accuracy of the client device 202e. In some cases, the mirror 230 can also act as a time provider for the network; that is, the mirror 230 can act as a grand master for a time synchronization tree.

In some implementations, the grand master 210 can be designated as the mirror server. In these implementations, the grand master 210 can receive packets from the client device 202e that include the client device's time information. The grand master 210 can then verify the accuracy of the client device's time.

In various implementations, the mirror 230 can check the accuracy of time maintained by one or more client devices, including the client device 202e. For example, every so often, the client device 202e can generate a packet, and include in the packet the time that the client device 202e obtained from the network 200. In some implementations, the client device 202e can transmit the time that the client device 202e captured from the network. In some implementations, the client device 202e can transmit the current value of the client device's clock. In some implementations, the client device 202e can transmit a value computed from the network time, such as the difference between the client device's current clock time and a time captured from the network 200. The packet can be any packet for transmitting data across the network 200, and need not be a packet formatted according to a time keeping protocols.

The client device 202e can transmit the packet to the mirror 230. Upon receiving the packet, the mirror 230 can compare the time sent by the client device 202e to the time that the mirror 230 itself synchronized from the network 200. For example, the mirror 230 can compute the difference between the client device's time and the mirror's time. When the difference is more than a threshold value (e.g., 10 ns, 100 ns, 1 ms, or some other value), the mirror 230 may determine that the client device's time is inaccurate.

When the mirror 230 determines that the client device's time is not accurate, the mirror 230 can take a number of different actions. For example, the mirror 230 can transmit an alert to network administrators. As another example, the mirror 230 can transmit a request to resynchronize the network time. In this example, the request may cause a synchronization cycle, in which the grand master 210 initiates time synchronization with the switch 204a, and from the switch 204a the grand master's time is distributed across the network 200. After the time synchronization cycle, in some cases, the mirror 230 may recheck the time at the client device 202e. If the client device 202e still has inaccurate time, the mirror 230 may again request resynchronization, or may take some other action.

In other examples, the mirror 230 may take some other corrective action. For example, the mirror 230 may transmit data to the client device 202e that informs the client device 202e that the client device 202e has inaccurate time. The data can include, for example, an offset, which the client device 202e can use to adjust the client device's internal clock. Alternatively or additionally, the data can include a simple notification that the client device's time is off, in which case the client device 202e may take a corrective action, such as requesting resynchronization with the grand master 210 or ceasing network communications until the clock accuracy is resolved.

In various implementations, the client device 202e can periodically transmit the client device's time to the mirror 230, and/or the mirror 230 can periodically poll the client device 202e. For example, every half hour, every hour, twice a day, once a day, or at some other interval, the client device 202e can generate and transmit a packet that includes the most recent time information that the client device 202e obtained from the network. Alternatively or additionally, in some implementations, after an interval of a half hour, hour, half day, or some other interval, the mirror 230 can send a request to the client device 202e. In this example, the client device 202e can respond to the request by generating and transmitting a packet that includes the time information. In various implementations, the interval between transmission by the client device 202e can be configurable.

In some cases, the client device 202e may miss a time synchronization cycle. For example, packets for synchronizing the time may have been dropped, or a link in the switch fabric 220 may have gone down and thereby disconnected the client device 202e from a time synchronization tree, or the grand master 210 may have gone offline, or something else may have happened to cause time synchronization at the client device 202e to have been missed. In these cases, when the client device 202e is due to send the client device's time to the mirror 230, in some implementations, the client device 202e may do nothing, or may send the last time that the client device 202e captured from the network, even though this time may be several minutes or hours old. When the mirror 230 receives this time, the mirror 230 may search through a history of captured times to identify a time that was captured in the same time synchronization cycle as the time that the client device 202e sent. The mirror 230 can then use the historic time to determine the client device's time accuracy. Alternatively or additionally, the mirror 230 can determine that the client device 202e missed a time synchronization cycle. In this latter case, the mirror 230 can output a notification, request resynchronization of the network time, can notify the client device 202e, or take some other action.

In some implementations, the network 200 can include more than one grand master. In some implementations, the multiple grand masters may be distributing time across the network 200 simultaneously. Additionally, a mirror server can be configured near each of the grand masters. In these implementations, the mirror to which the client device 202e ends time for verification can be periodically changed. For example, the client device 202e can be reconfigured to send the time to a different mirror, or the mirror can be reconfigured to request time from a different set of client devices. Changing the mirror and client device associations can avoid problems such as a mirror server going offline, a mirror's ability to capture and/or determine the accuracy of time becoming compromised, a grand master going off line, or other issues that can affect communication between a client device and a mirror. Client devices that are associated with a mirror may be selected based on the distance, in terms of network hops, between the client devices and the mirror (e.g., client devices that are very far from the mirror may be selected). Alternatively or additionally, the client devices may be selected randomly or using some other criteria.

Figure 3:
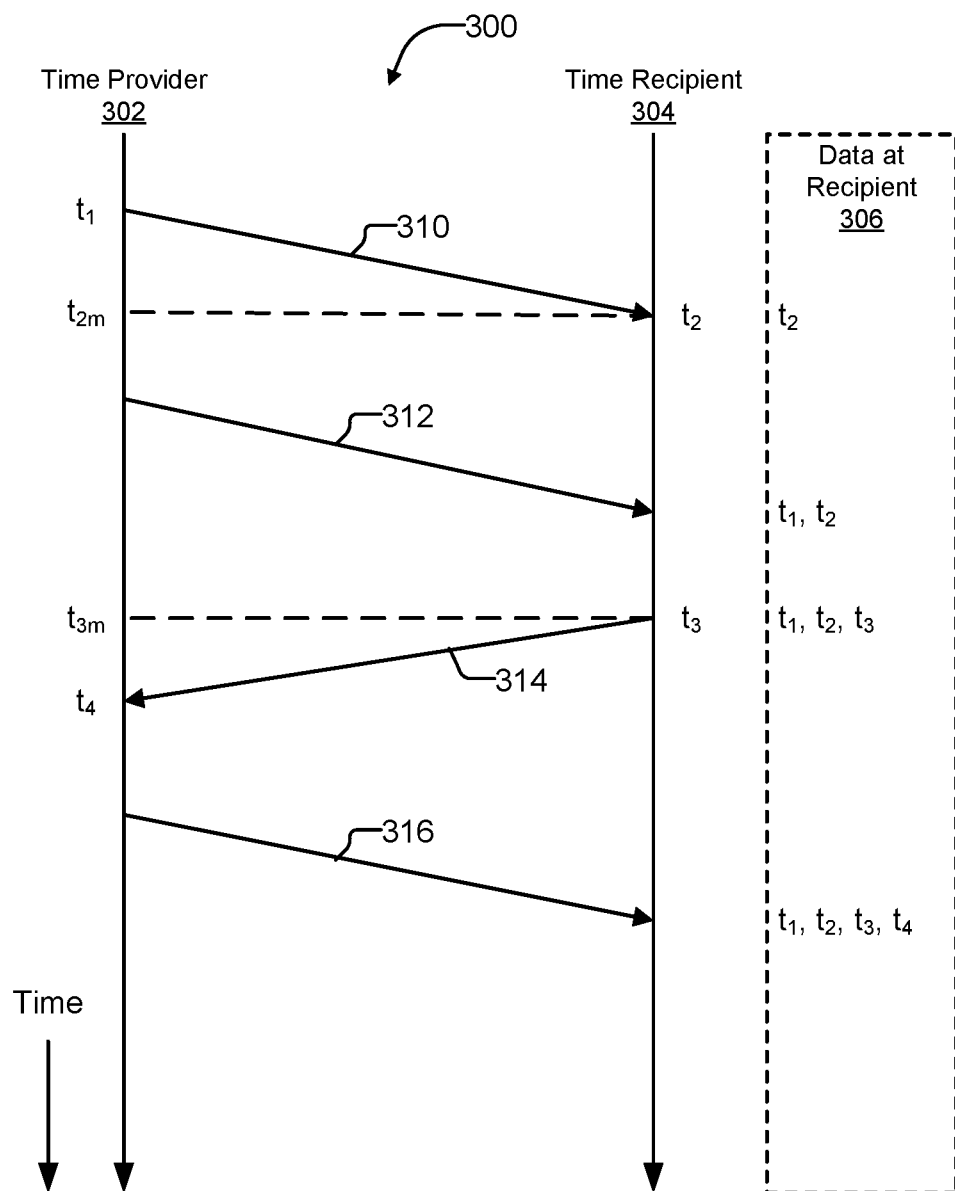
FIG. 3 illustrates an example of an exchange of network messages that can be used by a time provider to synchronize the time at a time recipient.

FIG. 3 illustrates an example of an exchange of network messages 300 that can be used by a time provider 302 to synchronize the time at a time recipient 304. Also illustrated is the data 306 stored by the time recipient 304 in the course of the exchange of messages 300. The particular messages 300, the contents of each message, and the timing of the transmission of each message can be determined by a time synchronization protocol. For example, the particular messages 300 illustrated in this example are based on the Precision Time Protocol (PTP). The Precision Time Protocol is defined in Institute of Electrical and Electronics Engineers (IEEE) 1588.

The exchange of messages 300 involves two devices (the time provider 302 and the time recipient 304 in this example) that share a network link, and thus are neighboring nodes on a network. Sharing a network link, in this context, means that the two devices need only the network link to communicate, and that there is no intervening device between the two devices (e.g., a server connected to, and communicating to a network through, a switch is a neighbor to the switch, but another server connected to the same switch is not a neighbor of the first server, but only a neighbor of the switch).

The time provider 302 is a network device, such as a host device or a network infrastructure device. Host devices include servers, desktop computers, laptop computers, handheld computers, personal digital assistants, and smartphones, among other computing devices. Network interface devices include routers, switches, hubs, repeaters, network controllers, and gateway devices, among others. The time recipient 304 is also a network device.

Both the time provider 302 and the time recipient 304 are capable of independently maintaining a time, including a date, hour, minute, seconds, and/or fractions of a second. The time provider 302 is considered the master or source, in that the time being maintained by the time recipient will be synchronized to the time of the time provider 302. The time recipient 304 is thus considered the slave or destination.

The exchange of messages 300 can be used to establish the difference between the time maintained by the time provider 302 and the time maintained by the time recipient 304. This difference will be referred to as the clock offset. The exchange of messages 300 can also be used to determine an approximate network delay over the link between the devices. The network delay is time it may take for messages to travel over the network link between the time provider 302 and the time recipient 304. The delay across the link can be assumed to be symmetric, since each of the messages 300 should have been transmitted over the same network link.

The clock offset and the network delay can be used in various ways to change to the time maintained by the time recipient 304 to be approximately (e.g., within an acceptable margin of difference) the same as the time maintained by the time provider 302. For example, a clock offset value of five indicates that the time at the time recipient 304 is five seconds ahead of the time at the time provider 302. In this example, the time recipient 304 can adjust its time keeping circuit back by five seconds. Additionally, if the network delay is one second, the time recipient 304 can further adjust its time keeping circuit back by one second, to accommodate the network delay.

The example exchange of messages 300 is initiated by the time provider 302. Upon transmitting the first message 310, the time provider 302 records a current time, $t_1$. The current time $t_1$ is based on the time being maintained by the time provider 302. The time $t_1$ is captured as close as possible to the time at which the message 310 is transmitted by the time provider 302. For example, $t_1$ may be captured as the message 310 begins to exit a port of the time provider 302.

When the time recipient 304 receives the first message 310, the time recipient 304 records a current time $t_2$. The time $t_2$ is taken from the time being maintained by the time recipient 304. The time $t_2$ is recorded as close as possible to when the messages 310 is received. For example, the time $t_2$ may be recorded in a port that receives the message 310, as soon as the message 310 has begun to be received. The time recipient 304 stores the time $t_2$.

The time provider 302 next sends a second message 312, which contains the value of $t_1$. Upon receiving the second message 312, the time recipient 304 can compute the difference between $t_2$ and $t_1$. The absolute value of the result of this computation is an approximate difference between the time maintained by the time provider 302 and the time maintained by the time recipient 304, possibly including the network delay. This value will be referred to as the master-to-slave difference.

The time recipient 304 next sends a third message 314, and record the current time, $t_3$, at the time the message 314 is sent. The time $t_3$ is based on the time maintained by the time recipient 304. Upon receiving the message 314, the time provider 302 also records a current time, $t_4$, in this case based on the time being maintained by the time provider 302.

The time provider 302 next sends a fourth message 316, which contains the value of $t_4$. Upon receiving this message 316, the time recipient 304 can compute the difference between $t_3$ and $t_4$. The absolute value of the result of this computation is an approximate difference between the time maintained by the time recipient 304 and the time maintained by the time provider 302, possibly including the network delay. This value will be referred to as the slave-to-master difference.

Using the master-to-slave difference and the slave-to-master difference, the time recipient 304 can now compute both a clock offset and a network delay. The clock offset can be computed by summing the master-to-slave different and the slave-to-master difference, and dividing the result by two. The time recipient 304 can use the clock offset to adjust its time, for example by adding or subtracting the clock offset, as appropriate. The network delay can be computed by subtracting the slave-to-master difference from the master-to-slave difference, and dividing the result by two. The absolute value of this computation is the network delay. The time recipient 304 can use the network delay to adjust timestamps received from the time provider 302. For example, packets received from the time provider device 302 can be assumed to have been sent n seconds in the past, where n is the network delay.

The time provider 302 may initiate the exchange of messages periodically, to ensure that the time at the time recipient 304 remains synchronized with the time at the time provider 302. Small variations in the time keeping circuits of different devices may cause each device's time to gradually change away from the time of the other device. Periodic synchronization can reduce such drift to having a negligible effect.

In some cases, the time provider 302 may be providing the time for more than one time recipient. In these cases, the time provider 302 and each time recipient can exchange a similar sequence of messages 300. The time provider 302 can exchange messages with each time recipient in parallel or serially. Each time recipient will subsequently synchronize their own time to the time of the time provider 302.

As discussed above, time can be distributed across a network using a tree structure. Hence, the time recipient 304 can also be a time provider. In some cases, once the time recipient 304 has synchronized to the time of the time provider 302, the time recipient 304 may then proceed to provide the time to one or more time recipients. In some cases, the time recipient 304 may provide to other time recipients periodically, where the period may not be the same as the period used by the time provider 302 to provide the time to the time recipient 304.

FIG. 3 illustrates one example of an exchange of messages 300 that can be used by two devices to synchronize to the same time. In various implementations, other messages, fewer messages, more messages, and/or messages with different contents can be used.

Figure 4:
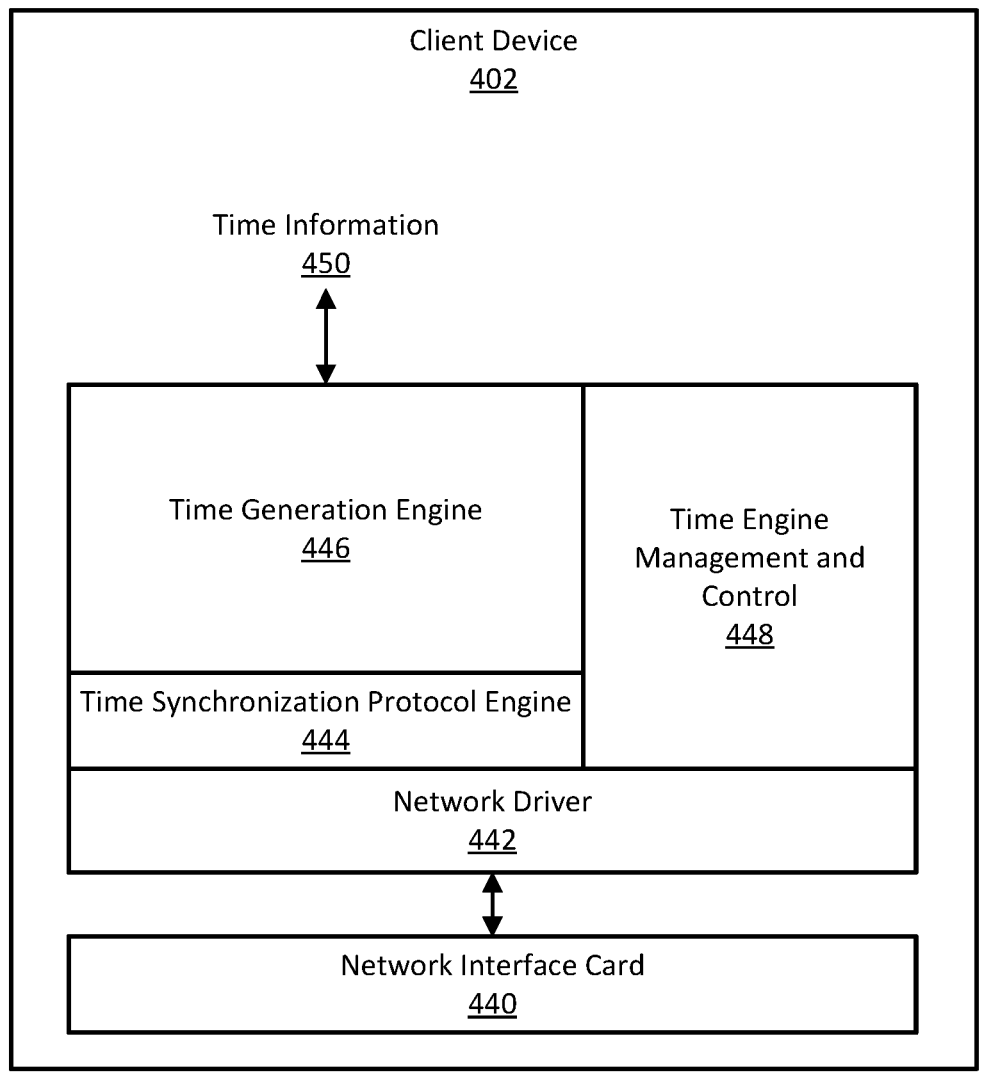
FIG. 4 illustrates an example of hardware and software for synchronizing time in a client device.

FIG. 4 illustrates an example of hardware and software for synchronizing time in a client device 402. The hardware of the client device 402 can include a network interface card 440, through which the client device 402 can communicate with a network. The software of the client device 402 can include a network driver 442, which can manage communications with other software running on the client device 402 and the network interface card 440. The network interface card 440 and the network driver 442 can be used by the client device 402 for any communications with the network, in addition to communications for purposes of synchronizing to a network time.

Software for synchronizing to the network time can include a time synchronization engine 444, a time generation engine 446, and a time engine management and control 448. These software modules are given as examples of time-related functionality that may be included in the client device. In various implementations, these modules can go by other names, and/or the operations of these modules can be conducted by other modules, such as by an operating system and/or a hypervisor. The client device 402 can also include other software modules for other operations.

The time synchronization engine 444 can implement a time synchronization protocol, such as PTP or NTP or some other time synchronization protocol. In various implementations, the time synchronization engine 444 can execute the protocol, including sending and receiving packets exchanged for synchronizing the time, determining whether or when to synchronize, and so on.

The time generation engine 446 can use the data obtained by the time synchronization engine 444 to determine the network time. For example, the time generation engine 446 can execute the computations described above with respect to FIG. 3, and can, as illustrated in FIG. 4, output time information 450 that can be used by other applications executing on the client device 402.

The time engine management and control 448 can coordinate the operations of the time synchronization engine 444 and time generation engine 446. For example, the time engine management and control 448 can include an interface through which time-related operations can be configured. As another example, the time engine management and control 448 can reset the time synchronization engine 444 should the time synchronization engine 444 experience a protocol error, a missing packet, or some other problem. As another example, in some implementations, the time engine management and control 448 can adjust the internal clock of the client device 402 according to the time determined by the time generation engine 446.

Figure 5:
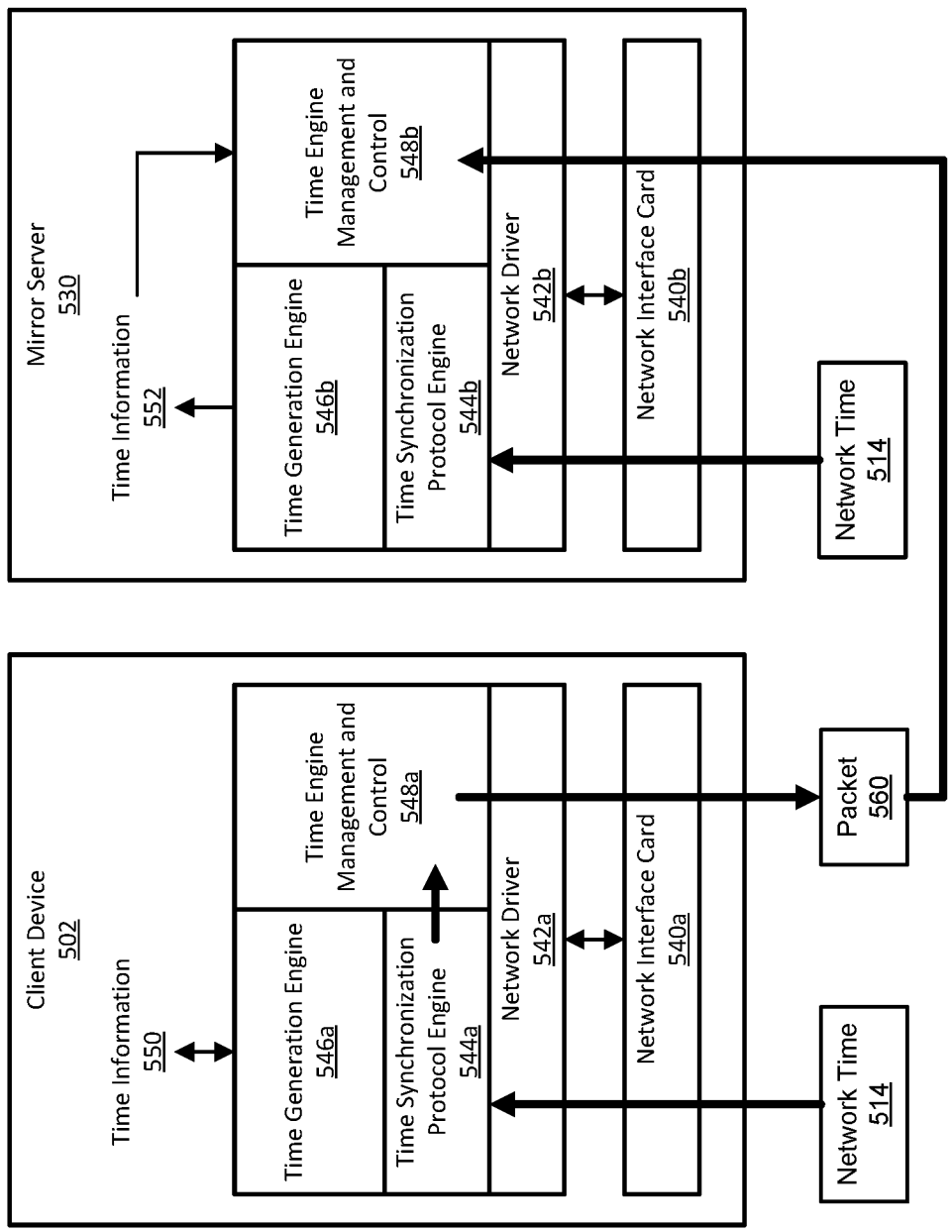
FIG. 5 illustrates an example of the operation of a client device and a mirror server.

FIG. 5 illustrates an example of the operation of a client device 502 and a mirror server 530, by which the mirror server can verify the accuracy of the time at the client device 502. The hardware of the client device 502 can include a network interface card 540a, through which the client device 502 can communicate with a network. The software of the client device 502 can include a network driver 542a, which can manage communications with other software running on the client device 502 and the network interface card 540a. Software for synchronizing to the network time can include a time synchronization and protocol engine 544a, a time generation engine 546a, and a time engine management and control 548a. The time synchronization and protocol engine 544a can execute a time synchronization protocol to obtain a network time 514 from the network. The time generation engine 546a can use the data obtained by the time synchronization and protocol engine 544a to determine time information 550 that can be provided other applications executing on the client device 502. The time engine management and control 548a can execute operations such as adjusting the internal clock of the client device 502 to the network time 514.

The mirror server 530 can have similar hardware and software as the client device 502. For example, the mirror server 530 can also have a network interface card 540b for communicating with the network, and a network driver 542b to manage usage of the network interface card 540b. The mirror server 530 can also have a time synchronization protocol engine 544b, a time generation engine 546b, and a time engine management and control 548b. By having a similar hardware and software structure, the mirror server 530 can obtain the network time 514 from the network in the same as the client device 502. Additionally, the mirror server 530 can produce the similar time information 552, possibly computed in the same fashion. The implementation of the mirror server 530 can also be simplified, in that any client device can be configured as a mirror server.

In various implementations, the client device 502 can periodically send a packet 560 to the mirror server 530, where the packet 560 includes the time that the client device 502 obtained from the network. For example, in some implementations, once the time synchronization and protocol engine 544a has completed operations necessary for obtaining the network time 514, the time synchronization and protocol engine 544a can transmit the resulting data to the time engine management and control 548a. The data can include, for example, timestamps from the client device 502 or a time provider, latencies, offsets, deltas, and so on. The time engine management and control 548a can place this data in the packet 560, and then transmit the packet 560 onto the network. In some implementations, the client device 502 may send the packet 560 upon having received a request from the mirror server 630.

In some implementations, the time engine management and control 548a may alternatively or additionally obtain network time data from the time generation engine 546a. For example, the time engine management and control 548a may include, in the packet 560, a time determined by the time generation engine 546a as the official network time.

In various implementations, the packet 560 can be received at the mirror server 530 by the mirror server's time engine management and control 548b. The time engine management and control 548b can also receive the time information 552 computed by the time generation engine 546b, and compare the time information 552 against the time information in the packet 560. For example, the time engine management and control 548b can determine any difference between the time information 550 determined by the client device 502 and the time information 552 determined by the mirror server 530. When the difference is greater than a threshold amount (e.g., 10 ns, 100 ns, 1 ms, or some other value), the time engine management and control 548b can determine and execute a corrective action. In other examples, the time engine management and control 548b can compare data obtained by the time synchronization engines 544a-544b, such as timestamps and/or offsets. In some implementations, the time engine management and control 548b can provide the timing data (e.g. timestamps, offsets, etc.) from the client device 502 to the time generation engine 546b of the mirror server 530, and can compare the resulting time information to the time information 552 computed from the data captured by the mirror server itself.

When the mirror server 530 determines that the client device 502 has not accurately captured and/or computed the network time, the mirror server 530 can take various actions. For example, the mirror server 530 can notify network administrators. Alternatively or additionally, the mirror server 530 can request resynchronization of the network time. Alternatively or additionally, the mirror server 530 can notify the client device 502 of the inaccuracy. Alternatively or additionally, the client device 502, upon being notified, can attempt to correct the client device's clock, for example by adjusting the clock, by requesting resynchronization to the network time, by raising an alert, by notifying any applications executing on the client device 502, and/or by ceasing network communications.

Figure 6:
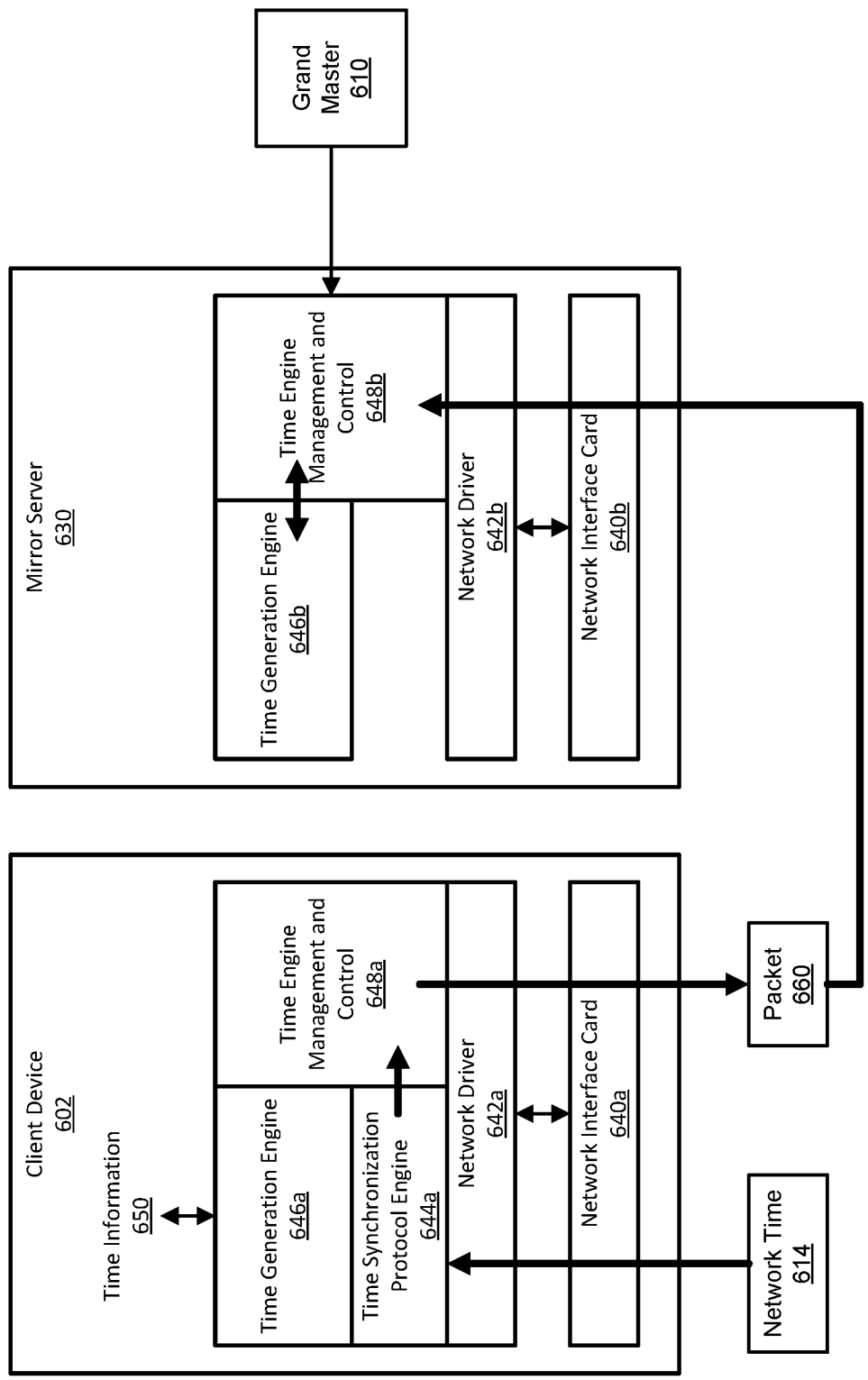
FIG. 6 illustrates an example of the operation of a client device and a mirror server.

FIG. 6 illustrates an example of the operation of a client device 602 and a mirror server 630, by which the mirror server can verify the accuracy of the time at the client device 602. The hardware of the client device 602 can include a network interface card 640a, through which the client device 602 can communicate with a network. The software of the client device 602 can include a network driver 642a, which can manage communications with other software running on the client device 602 and the network interface card 640a. Software for synchronizing to the network time can include a time synchronization and protocol engine 644a, a time generation engine 646a, and a time engine management and control 648a. The time synchronization and protocol engine 644a can execute a time synchronization protocol to obtain a network time 614 from the network. The time generation engine 646a can use the data obtained by the time synchronization and protocol engine 644a to determine time information 650 that can be provided other applications executing on the client device 602. The time engine management and control 648a can execute operations such as adjusting the internal clock of the client device 602 to the network time 614.

The mirror server 630 can have similar hardware and software as the client device 602. For example, the mirror server 630 can also have a network interface card 640b for communicating with the network, and a network driver 642b to manage usage of the network interface card 640b. The mirror server 630 can also have a time generation engine 646b and a time engine management and control 648b. By having a similar hardware and software structure, the mirror server 630 can compute time information in a similar fashion as the client device 602. The implementation of the mirror server 630 can also be simplified, in that any client device can be configured as a mirror server.

In various implementations, the client device 602 can periodically send a packet 660 to the mirror server 630, where the packet 660 includes the time that the client device 602 obtained from the network. For example, in some implementations, once the time synchronization and protocol engine 644a has completed operations necessary for obtaining the network time 614, the time synchronization and protocol engine 644a can transmit the resulting data to the time engine management and control 648a. The data can include, for example, timestamps from the client device 602 or a time provider, latencies, offsets, differences, and so on. The time engine management and control 648a can place this data in the packet 660, and then transmit the packet 660 onto the network. In some implementations, the client device 602 may send the packet 660 after having received a request from the mirror server 630.

In various implementations, the mirror server 630 can check the data in the packet 660 against time information obtained directly from a grand master 610. The mirror server 630 may have a dedicated communication channel with the grand master 610, over which the mirror server 630 can receive the time being maintained by the grand master 610. Because the mirror server 630 has a dedicated, possibly exclusive, communication channel with the grand master 610, the mirror server 630 is likely to have very accurate time. In most cases, the communication channel is physically short, so that latencies introduced by physical limitations have little effect on the time obtained by the mirror server 630.

In various implementations, the mirror server 630 can compare the time from the grand master 610 with the time captured by the client device 602. For example, the time engine management and control 648b of the mirror server 630 can provide data captured by the client device 602 (e.g., timestamps, offsets, etc.) to the time generation engine 646b of the mirror server 630, to produce the time information 650 produced by the client device 602. In this example, the time engine management and control 648b can compare the time information 650 against the time from the grand master 610, and determine whether the client device's time deviates more than an acceptable threshold. When the client device's time is within the threshold, the mirror server 630 may take no further action. When the client device's time is outside the threshold, the mirror server 630 may take corrective action.

Figure 7:
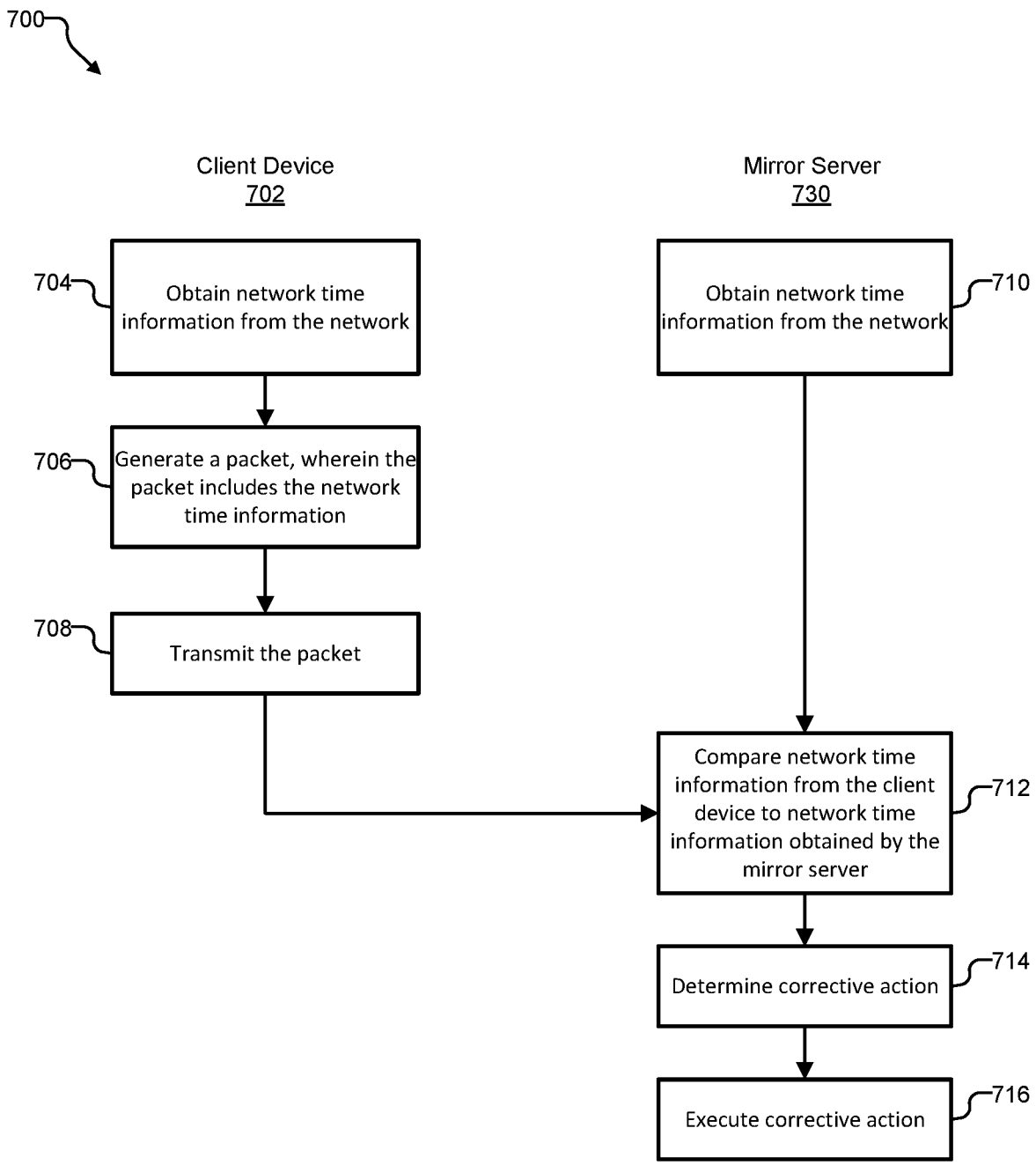
FIG. 7 illustrates an example of a process for verifying the accuracy of network time captured by a client device, using a mirror server.

FIG. 7 illustrates an example of a process 700 for verifying the accuracy of network time captured by a client device 702, using a mirror server 730. This process may be implemented by the systems described above, such as for example the systems illustrated in FIGS. 1, 2, 5, and 6.

At step 704, the client device 702 can obtain network time information from the network. As discussed above, the network time can be distributed across the network using a time synchronization protocol, where the network time is maintained and provided by a master time keeper or grand master. The client device 702 can include an engine that implements the time synchronization protocol, and using this engine, the client device 702 can obtain network time information being distributed by the master time keeper. The client device 702 can use the network time information compute a network time, and can further synchronize the client device's clock to the network time. The client device 702 can also provide the network time to applications executing on the client device.

At step 706, the client device 702 can generate a packet, wherein the packet includes the network time information. In some implementations, the client device 702 can generate the packet periodically, such as after a time synchronization cycle (e.g., after having exchanged packets with a time provider to synchronize to the network time), or every five minutes, half hour, hour, half day, once a week, or some other interval of time. In some implementations, the client device 702 can receive a request from the mirror server 730, upon which the client device 702 can respond by generating the packet. In these implementations, the mirror server 730 may generate the request periodically.

At step 708, the client device 702 can transmit the packet into the network. The packet can be addressed to the mirror server 730.

At step 710, the mirror server 730 can also obtain network time information from the network. In some implementations, the mirror server 730 can obtain the network time using an engine that implements a time synchronization protocol. This engine can exchange packets with the network and obtain network time information being distributed by a master time keeper. In some implementations, the mirror server 730 has a dedicated communication channel to a master time keeper, and obtains network time information using the dedicated communication channel. Having a dedicated communication channel increase the likelihood that the mirror server 730 is using accurate network time information. In some implementations, the mirror server 730 includes a clock source, such as an atomic clock or satellite navigation system receiver, and obtains the network time information from the clock source. In these implementations, the mirror server 730 may distribute network time information to the network.

In some cases, at step 710 the mirror server 730 obtains the network time information in the same synchronization cycle in which the client device 702 obtains the network time information, in step 704. In some cases, the synchronization cycle in step 710 may be a different synchronization cycle, in which case the mirror server 730 can use historic time information, saved by the mirror server 730, to evaluate the client device's time accuracy.

At step 712, the mirror server 730 can receive the packet transmitted by the client device 702, and can compare the network time information obtained by the client device to the network time information obtained by the mirror server 730. This comparison can include determining a difference between the network time information of the client device 702 and the network time information of the mirror server 730. When the difference is greater than threshold, the mirror server 730 can proceed to step 714, and determine a corrective action. In various implementations, the corrective action can include, for example, sending an alert to the network and/or to system administrators, requesting that the network resynchronize the network time (e.g., send a request to the grand master to initiate a time synchronization cycle), sending a notification to the client device 702 (e.g., by sending a packet to the client device 702), and other possible actions.

At step 716, the mirror server 730 can execute the corrective action.

In some implementations, when the client device 702 receives a notification that the client device's time is inaccurate, the client device can take a corrective action. For example, the notification can include information that the client device 702 can use to correct the client device's clock, such as a current time or time offset. As another example, upon receiving the notification, the client device can resynchronize to the network time (e.g., obtain new network time information and re-compute the network time) or can request that a time synchronization cycle be initiated. As another example, the client device 702 can raise an alert, which can be received by other devices on the network, network administrators, and/or applications executing on the client device 702. In some implementations, the alert can inform the applications that the client device does not currently have accurate time. As another example, the client device 702 can cease communications with the network (e.g., by disconnecting from the network) until the client device's time is corrected.

Figure 8:
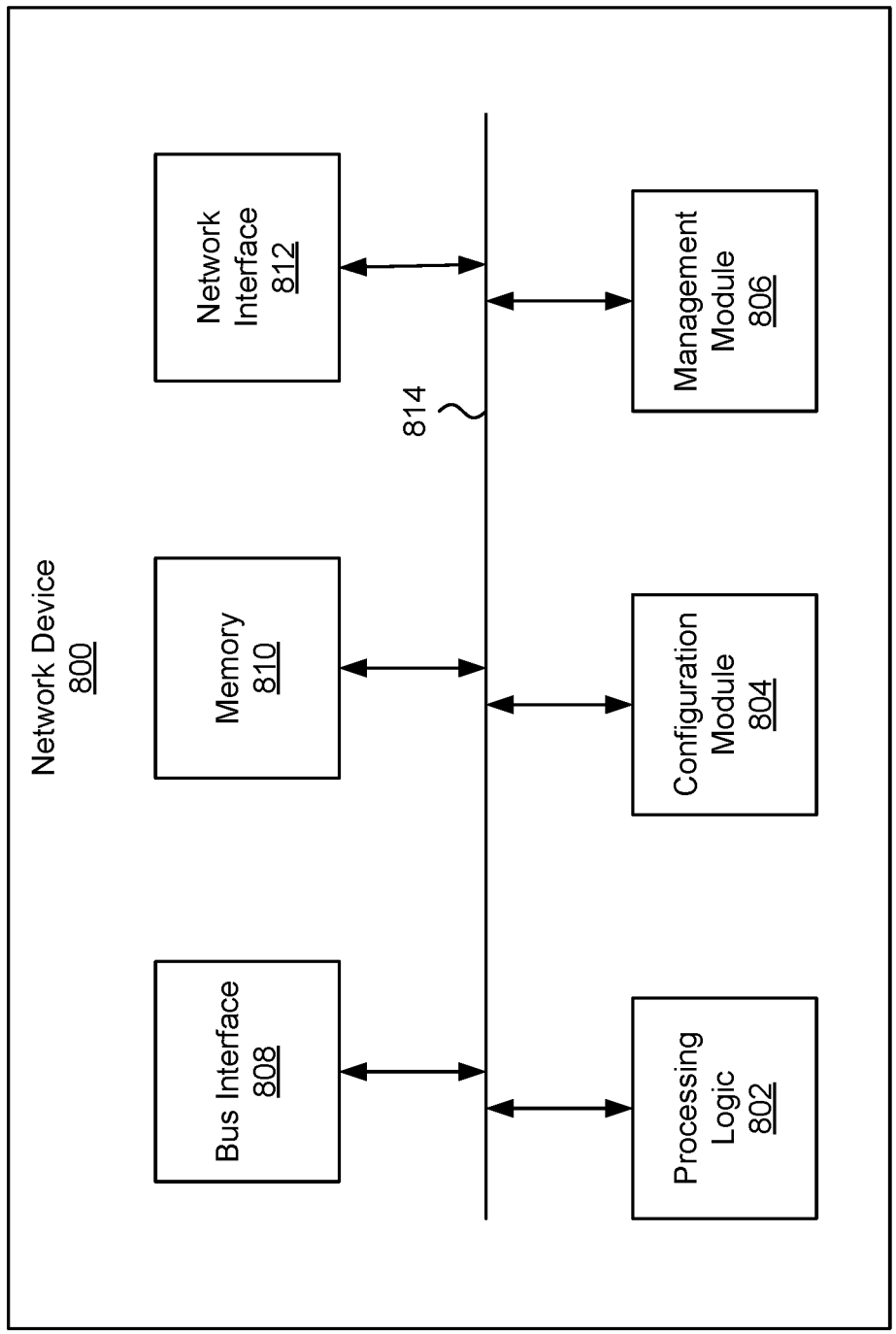
FIG. 8 illustrates an example of a network device, according to certain aspects of the disclosure.

FIG. 8 illustrates an example of a network device 800. Functionality and/or several components of the network device 800 may be used without limitation with other embodiments disclosed elsewhere in this disclosure, without limitations. A network device 800 may facilitate processing of packets and/or forwarding of packets from the network device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 800 may be the recipient and/or generator of packets. In some implementations, the network device 800 may modify the contents of the packet before forwarding the packet to another device. The network device 800 may be a peripheral device coupled to another computer device, a switch, a router or any other suitable device enabled for receiving and forwarding packets.

In one example, the network device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The network device 800 may include additional modules, not illustrated here, such as components discussed with respect to the nodes disclosed in FIG. 9. In some implementations, the network device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 802 may include processors developed by ARM®, MIPS®, AMID®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the network device 800, while in other cases some or all of the memory may be external to the network device 800. The memory 810 may store an operating system comprising executable instructions that, when executed by the processing logic 802, provides the execution environment for executing instructions providing networking functionality for the network device 800. The memory may also store and maintain several data structures and routing tables for facilitating the functionality of the network device 800.

In some implementations, the configuration module 804 may include one or more configuration registers. Configuration registers may control the operations of the network device 800. In some implementations, one or more bits in the configuration register can represent certain capabilities of the network device 800. Configuration registers may be programmed by instructions executing in the processing logic 802, and/or by an external entity, such as a host device, an operating system executing on a host device, and/or a remote device. The configuration module 804 may further include hardware and/or software that control the operations of the network device 800.

In some implementations, the management module 806 may be configured to manage different components of the network device 800. In some cases, the management module 806 may configure one or more bits in one or more configuration registers at power up, to enable or disable certain capabilities of the network device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the network device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 800 may include multiple network interface modules, each configured to communicate with a different network. For example, in these implementations, the network device 800 may include a network interface module for communicating with a wired Ethernet network, a wireless 802.11 network, a cellular network, an Infiniband network, etc.

The various components and modules of the network device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 9.

Figure 9:
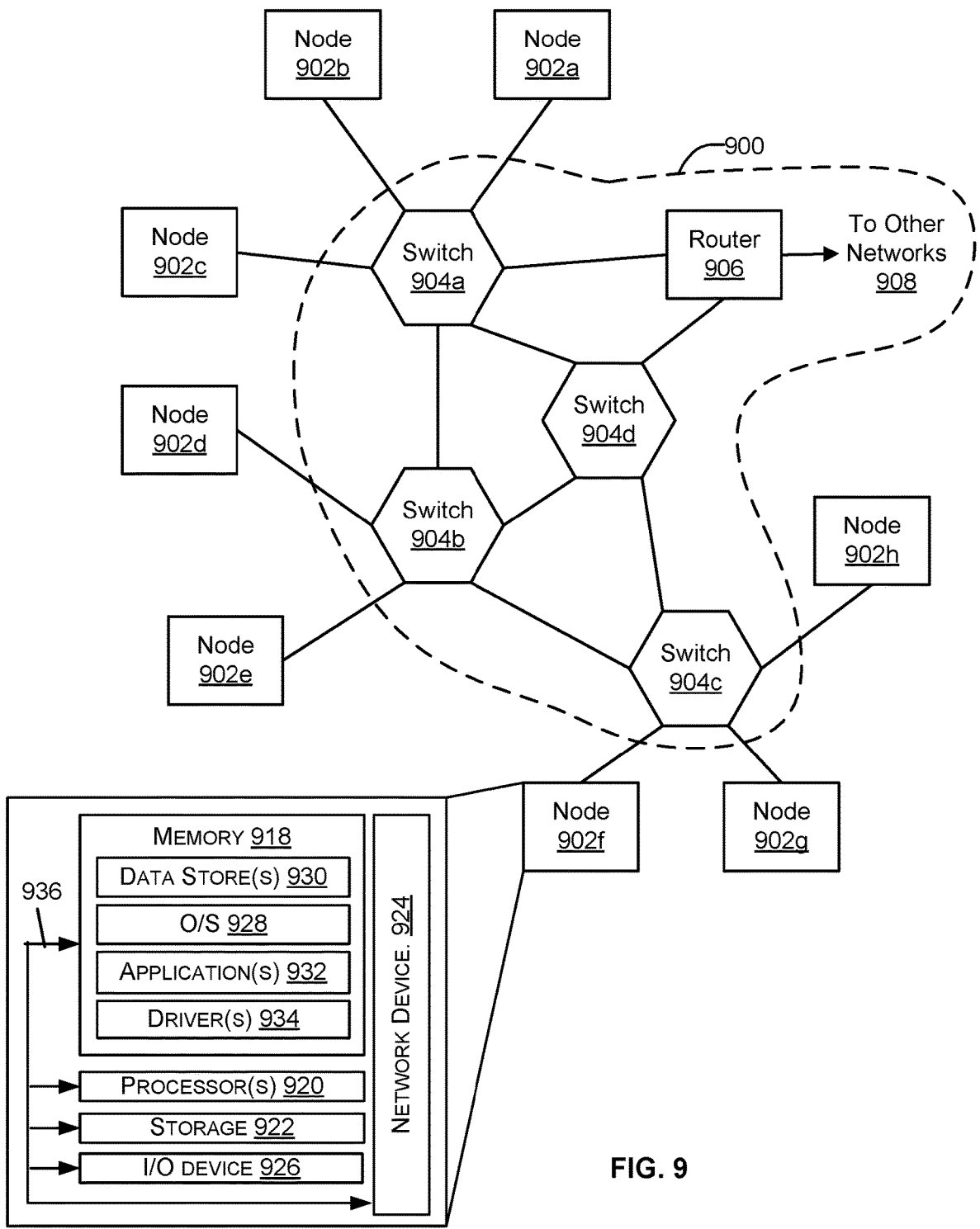
FIG. 9 illustrates an example architecture for features and systems described herein that includes one or more service provider computers and/or a user device connected via one or more networks, according to certain aspects of the disclosure.

FIG. 9 illustrates a network 900, illustrating various different types of network devices 800 of FIG. 8, such as nodes comprising the network device, switches and routers. In certain embodiments, the network 900 may be based on a switched architecture with point-to-point links. As illustrated in FIG. 9, the network 900 includes a plurality of switches 904a-904d, which may be arranged in a network. In some cases, the switches are arranged in a multi-layered network, such as a Clos network. A network device 800 that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 904a-904d may be connected to a plurality of nodes 902a-902h and provide multiple paths between any two nodes.

The network 900 may also include one or more network devices 800 for connection with other networks 908, such as other subnets, LANs, wide area networks (WANs), or the Internet, and may be referred to as routers 906. Routers use headers and forwarding tables to determine the best path for forwarding the packets, and use protocols such as internet control message protocol (ICMP) to communicate with each other and configure the best route between any two devices.

In some examples, network(s) 900 may include any one or a combination of many different types of networks, such as cable networks, the Internet, wireless networks, cellular networks and other private and/or public networks. Interconnected switches 904a-904d and router 906, if present, may be referred to as a switch fabric, a fabric, a network fabric, or simply a network. In the context of a computer network, terms "fabric" and "network" may be used interchangeably herein.

Nodes 902a-902h may be any combination of host systems, processor nodes, storage subsystems, and I/O chassis that represent user devices, service provider computers or third party computers.

User devices may include computing devices to access an application 932 (e.g., a web browser or mobile device application). In some aspects, the application 932 may be hosted, managed, and/or provided by a computing resources service or service provider. The application 932 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 908. Additionally, the user device(s) may be part of the distributed system managed by, controlled by, or otherwise part of the service provider computer(s) (e.g., a console device integrated with the service provider computers).

The node(s) of FIG. 9 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 932 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 902a-902h may include at least one memory 918 and one or more processing units (or processor(s) 920). The processor(s) 920 may be implemented in hardware, computer-executable instructions, firmware, or combinations thereof. Computer-executable instruction or firmware implementations of the processor(s) 920 may include computer-executable or machine-executable instructions written in any suitable programming language to perform the various functions described.

In some instances, the hardware processor(s) 920 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 918 may store program instructions that are loadable and executable on the processor(s) 920, as well as data generated during the execution of these programs. Depending on the configuration and type of the node(s) 902a-902h, the memory 918 may be volatile (such as RAM) and/or non-volatile (such as ROM, flash memory, etc.). The memory 918 may include an operating system 928, one or more data stores 930, one or more application programs 932, one or more drivers 934, and/or services for implementing the features disclosed herein.

The operating system 928 may support nodes 902a-902h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™ and the like. The operating system 928 may also be a proprietary operating system.

The data stores 930 may include permanent or transitory data used and/or operated on by the operating system 928, application programs 932, or drivers 934. Examples of such data include web pages, video data, audio data, images, user data, and so on. The information in the data stores 930 may, in some implementations, be provided over the network(s) 908 to the nodes 902a-902h. In some cases, the data stores 930 may additionally or alternatively include stored application programs and/or drivers. Alternatively or additionally, the data stores 930 may store standard and/or proprietary software libraries, and/or standard and/or proprietary application user interface (API) libraries. Information stored in the data stores 930 may be machine-readable object code, source code, interpreted code, or intermediate code.

The drivers 934 include programs that may provide communication between components in a node. For example, some drivers 934 may provide communication between the operating system 928 and additional storage 922, network device 924, and/or I/O device 926. Alternatively or additionally, some drivers 934 may provide communication between application programs 932 and the operating system 928, and/or application programs 932 and peripheral devices accessible to the service provider computer. In many cases, the drivers 934 may include drivers that provide well-understood functionality (e.g., printer drivers, display drivers, hard disk drivers, Solid State Device drivers). In other cases, the drivers 934 may provide proprietary or specialized functionality.

The service provider computer(s) or servers may also include additional storage 922, which may include removable storage and/or non-removable storage. The additional storage 922 may include magnetic storage, optical disks, solid state disks, flash memory, and/or tape storage. The additional storage 922 may be housed in the same chassis as the node(s) 902a-902h or may be in an external enclosure. The memory 918 and/or additional storage 922 and their associated computer-readable media may provide non-volatile storage of computer-readable instructions, data structures, program modules, and other data for the computing devices. In some implementations, the memory 918 may include multiple different types of memory, such as SRAM, DRAM, or ROM.

The memory 918 and the additional storage 922, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 918 and the additional storage 922 are examples of computer storage media. Additional types of computer storage media that may be present in the node(s) 902a-902h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 902a-902h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 902a-902h may also include I/O device(s) 926, such as a keyboard, a mouse, a pen, a voice input device, a touch input device, a display, speakers, a printer, and the like. The node(s) 902a-902h may also include one or more communication channels 936. A communication channel 936 may provide a medium over which the various components of the node(s) 902a-902h can communicate.

The communication channel or channels 936 may take the form of a bus, a ring, a switching fabric, or a network.

The node(s) 902a-902h may also contain network device(s) 924 that allow the node(s) 902a-902h to communicate with a stored database, another computing device or server, user terminals and/or other devices on the network(s) 900. The network device(s) 924 of FIG. 9 may include similar components discussed with reference to the network device 800 of FIG. 8.

In some implementations, the network device 924 is a peripheral device, such as a PCI-based device. In these implementations, the network device 924 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express(PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 808 may implement NVMe, and the network device 924 may be connected to a computing system using a PCIe interface.

A PCI-based device may include one or more functions. A "function" describes operations that may be provided by the network device 924. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 924 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. 9, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
    obtaining, by a client device on a network during a first synchronization cycle, first network time information from a master time keeper via at least one intermediate network infrastructure device on the network, wherein the client device uses the first network time information to determine a device time;
    obtaining, by a mirror server on the network during a second synchronization cycle different from the first synchronization cycle, second network time information from the master time keeper via fewer intermediate network infrastructure devices on the network than the at least one intermediate network infrastructure device;
    generating, by the client device, a packet, wherein the packet includes the first network time information obtained by the client device;
    transmitting, by the client device, the packet over the network to the mirror server;
    upon receiving the packet, determining, by the mirror server, a difference between the first network time information obtained by the client device and the second network time information obtained by the mirror server;
    determining, by the mirror server, a corrective action when the difference is greater than a threshold; and
    executing, by the mirror server, the corrective action.

2. The method of claim 1, wherein the second network time information is provided by a master time keeper on the network.

3. The method of claim 1, wherein the client device and the mirror server obtain the first network time information and the second network time information using a time keeping protocol.

4. A device, comprising:
    one or more processors; and
    a non-transitory computer-readable medium coupled to and readable by the one or more processors, including instructions that, when executed by the one or more processors, cause the one or more processors to perform operations including:
        obtaining, during a first synchronization cycle, first network time information from a master time keeper via at least one intermediate network infrastructure device on a network;
        using the first network time information to determine a network time, wherein determining the network time includes setting a clock associated with the device to the network time;
        providing the network time to an application executing on the device;

generating a packet, wherein the packet includes the first network time information;

transmitting the packet to a server on the network, wherein the server is designated for verifying accuracy of the clock, and wherein the server is configured to receive, during a second synchronization cycle different from the first synchronization cycle, second network time information from the master time keeper via fewer intermediate network infrastructure devices on the network than the at least one intermediate network infrastructure device;

receiving data from the server, wherein the data is associated with accuracy of the clock; and notifying the application when the data indicates that the clock is inaccurate.

5. The device of claim 4, wherein the device generates and transmits the packet periodically.

6. The device of claim 4, the operations further comprising:

receiving a request from the server, wherein the packet is generated and transmitted in response to the request.

7. The device of claim 4, the operations further comprising:

using the data to execute an action associated with the clock.

8. The device of claim 7, wherein the action includes correcting the clock.

9. The device of claim 7, wherein the action includes obtaining new network time information from the master time keeper and using the new network time information to determine a new network time.

10. The device of claim 7, wherein the action includes transmitting an alert.

11. The device of claim 7, wherein the action includes ceasing network communications.

12. The device of claim 4, wherein obtaining the first network time information includes an exchange of one or more packets, wherein the packets are exchanged according to a time synchronization protocol.

13. An apparatus, comprising:
one or more processors; and
a non-transitory memory coupled to and readable by the one or more processors, including instructions that, when executed by the one or more processors, cause the one or more processors to perform operations including:
receiving a packet over a network, wherein the packet includes first network time information obtained during a first synchronization cycle by a client device from a master time keeper via at least one intermediate network infrastructure device on the network;

obtaining, during a second synchronization cycle different from the first synchronization cycle, second network time information from the master time keeper via fewer intermediate network infrastructure devices on the network than the at least one intermediate network infrastructure device;

comparing the second network time information obtained by the apparatus to the first network time information obtained by the client device, wherein comparing includes determining a difference between the second network time information obtained by the apparatus and the first network time information obtained by the client device;

determining a corrective action when the difference is greater than a threshold; and executing the corrective action.

14. The apparatus of claim 13, the operations further comprising:

periodically transmitting a request to the client device, wherein, when the client device receives the request, the client device transmits the packet.

15. The apparatus of claim 13, wherein the apparatus is directly coupled to a switch, wherein the master time keeper is directly coupled to the switch.

16. The apparatus of claim 13, wherein the apparatus includes a dedicated communication channel with the master time keeper, wherein the apparatus obtains the second network time information using the dedicated communication channel.

17. The apparatus of claim 13, wherein the master time keeper includes an atomic clock or a satellite navigation system receiver.

18. The apparatus of claim 13, wherein the apparatus is a mirror server.

19. The apparatus of claim 13, wherein the corrective action includes requesting resynchronization of the first network time information.

20. The apparatus of claim 13, wherein the corrective action includes transmitting a notification to the client device.

21. The apparatus of claim 13, wherein the apparatus is configured to compare the second network time information to network time information obtained by multiple client devices.

* * * * *